United States Patent
Kalinichenko et al.

(10) Patent No.: US 9,672,519 B2
(45) Date of Patent: Jun. 6, 2017

(54) MOBILE DEVICE SOFTWARE RADIO FOR SECURELY PASSING FINANCIAL INFORMATION BETWEEN A CUSTOMER AND A FINANCIAL SERVICES FIRM

(75) Inventors: Boris Olegovich Kalinichenko, Jamaica Plain, MA (US); Joseph G. Ferra, Dover, MA (US)

(73) Assignee: FMR LLC, Boston, MA (US)

( * ) Notice: Subject to any disclaimer, the term of this patent is extended or adjusted under 35 U.S.C. 154(b) by 1260 days.

(21) Appl. No.: 13/492,210

(22) Filed: Jun. 8, 2012

(65) Prior Publication Data
US 2013/0332366 A1 Dec. 12, 2013

(51) Int. Cl.
*H04M 1/66* (2006.01)
*G06Q 20/42* (2012.01)
*G06Q 20/32* (2012.01)

(52) U.S. Cl.
CPC ......... *G06Q 20/425* (2013.01); *G06Q 20/322* (2013.01); *G06Q 20/3223* (2013.01)

(58) Field of Classification Search
None
See application file for complete search history.

(56) References Cited

U.S. PATENT DOCUMENTS

| | | | | |
|---|---|---|---|---|
| 4,625,276 A | * | 11/1986 | Benton | G06Q 20/00 235/379 |
| 4,694,485 A | * | 9/1987 | Iwase | H04M 1/72511 455/464 |
| 4,777,646 A | * | 10/1988 | Harris | G06Q 20/32 379/114.19 |
| 5,867,766 A | * | 2/1999 | Dinc | H04W 36/06 455/214 |
| 5,950,176 A | * | 9/1999 | Keiser | G06Q 40/00 705/35 |
| 5,983,203 A | * | 11/1999 | Church | G06Q 40/04 705/35 |
| 6,002,772 A | * | 12/1999 | Saito | G06F 21/10 348/E7.056 |
| 6,012,049 A | * | 1/2000 | Kawan | G06Q 20/04 235/379 |

(Continued)

FOREIGN PATENT DOCUMENTS

JP 2006270910 A 10/2006
JP 2009042954 A 2/2009

OTHER PUBLICATIONS

Brawerman, A., "A Fraud-Prevention Framework for Software Defined Radio Mobile Devices," Georgia Institute of Technology, Aug. 2005, 93 pages.

(Continued)

*Primary Examiner* — Mamon Obeid
(74) *Attorney, Agent, or Firm* — Proskauer Rose LLP

(57) ABSTRACT

A computing device having a software radio (e.g., a mobile device where the software radio is substantially defined in software) transmits first information related to a financial transaction over the first radio network to the financial institution, and transmits second information related to the financial transaction over the second radio network to the financial institution. A server of the financial institution receives the first information and the second information to carry out the financial transaction.

20 Claims, 2 Drawing Sheets

(56) References Cited

U.S. PATENT DOCUMENTS

| | | | | |
|---|---|---|---|---|
| 6,118,874 | A * | 9/2000 | Okamoto | H04L 9/0894 380/282 |
| 6,163,771 | A * | 12/2000 | Walker | G06Q 20/04 705/18 |
| 6,215,877 | B1 * | 4/2001 | Matsumoto | H04L 9/0825 380/277 |
| 6,324,525 | B1 * | 11/2001 | Kramer | G06Q 20/00 705/40 |
| 6,418,420 | B1 * | 7/2002 | DiGiorgio | G06Q 20/00 705/39 |
| 7,305,549 | B2 * | 12/2007 | Hunt | H04L 9/3273 713/154 |
| 7,697,692 | B2 * | 4/2010 | Takata | H04L 9/083 380/277 |
| 8,417,258 | B2 * | 4/2013 | Barnes, Jr. | G06Q 10/1053 455/414.3 |
| 8,520,571 | B2 * | 8/2013 | Chaudhuri | G06F 15/7842 370/310 |
| 8,606,314 | B2 * | 12/2013 | Barnes, Jr. | G06Q 10/1053 370/338 |
| 8,606,720 | B1 * | 12/2013 | Baker | G06Q 20/00 705/64 |
| 8,756,256 | B2 * | 6/2014 | Tugnawat | H04W 8/183 455/411 |
| 9,185,626 | B1 * | 11/2015 | Kunkel | H04W 40/02 |
| 2002/0131601 | A1 * | 9/2002 | Ninomiya | H04L 9/0822 380/277 |
| 2002/0194473 | A1 * | 12/2002 | Pope | G06F 21/31 713/168 |
| 2003/0016770 | A1 * | 1/2003 | Trans | H04B 1/00 375/346 |
| 2003/0101143 | A1 * | 5/2003 | Montgomery | G07B 17/00435 705/62 |
| 2003/0105967 | A1 * | 6/2003 | Nam | G06F 12/1408 713/189 |
| 2003/0163383 | A1 * | 8/2003 | Engelhart | G06Q 20/02 705/75 |
| 2003/0220835 | A1 * | 11/2003 | Barnes, Jr. | G06Q 10/1053 705/14.36 |
| 2003/0233329 | A1 * | 12/2003 | Laraki | G06Q 20/123 705/52 |
| 2004/0039651 | A1 * | 2/2004 | Grunzig | G06Q 20/04 705/26.1 |
| 2004/0148254 | A1 * | 7/2004 | Hauser | G06Q 20/02 705/39 |
| 2004/0148628 | A1 * | 7/2004 | Mears | H04N 5/44543 725/43 |
| 2004/0171373 | A1 * | 9/2004 | Suda | H04W 88/06 455/415 |
| 2004/0205348 | A1 * | 10/2004 | Watanabe | G06Q 20/4012 713/182 |
| 2004/0267665 | A1 * | 12/2004 | Nam | G06Q 20/04 705/41 |
| 2005/0086298 | A1 * | 4/2005 | Campbell | G06Q 40/00 709/203 |
| 2005/0102509 | A1 * | 5/2005 | Fascenda | G06Q 20/02 713/165 |
| 2005/0160098 | A1 * | 7/2005 | Campbell | G06Q 30/04 |
| 2005/0204128 | A1 * | 9/2005 | Aday | H04L 9/0825 713/152 |
| 2005/0216412 | A1 * | 9/2005 | Kalinichenko | G06Q 10/02 705/50 |
| 2006/0136334 | A1 * | 6/2006 | Atkinson | G06Q 10/087 705/40 |
| 2006/0179006 | A1 * | 8/2006 | Humpleman | G06Q 20/382 705/64 |
| 2006/0224470 | A1 * | 10/2006 | Garcia Ruano | G06Q 20/04 705/26.1 |
| 2006/0264228 | A1 * | 11/2006 | Wertheimer | H04B 17/23 455/513 |
| 2007/0097922 | A1 * | 5/2007 | Parekh | H04W 68/12 370/332 |
| 2007/0118891 | A1 * | 5/2007 | Buer | G06F 21/34 726/8 |
| 2007/0173266 | A1 * | 7/2007 | Barnes, Jr. | G06Q 10/1053 455/456.1 |
| 2007/0223507 | A1 * | 9/2007 | Lien | H04L 12/2856 370/431 |
| 2007/0239621 | A1 * | 10/2007 | Stukanov | G06Q 20/347 705/72 |
| 2007/0245158 | A1 * | 10/2007 | Giobbi | G06F 21/31 713/186 |
| 2008/0114480 | A1 * | 5/2008 | Harb | G06Q 30/06 700/94 |
| 2008/0165972 | A1 * | 7/2008 | Worthington | H04L 12/58 380/278 |
| 2009/0196306 | A1 * | 8/2009 | King | H04L 12/40084 370/462 |
| 2009/0216679 | A1 * | 8/2009 | Yeap | G06F 21/43 705/71 |
| 2009/0325539 | A1 * | 12/2009 | Malik | G06Q 20/32 455/405 |
| 2010/0035587 | A1 * | 2/2010 | Bennett | H04L 67/34 455/414.1 |
| 2010/0042841 | A1 * | 2/2010 | King | H04L 9/0891 713/171 |
| 2010/0097956 | A1 * | 4/2010 | Tauil | H04W 8/18 370/254 |
| 2010/0223165 | A1 * | 9/2010 | Calman | G06Q 40/02 705/30 |
| 2010/0287038 | A1 * | 11/2010 | Copejans | G07B 15/063 705/13 |
| 2010/0293099 | A1 * | 11/2010 | Pauker | G06Q 20/20 705/67 |
| 2011/0313826 | A1 * | 12/2011 | Keen | G06Q 10/107 705/14.4 |
| 2012/0086549 | A1 * | 4/2012 | Barnes, Jr. | G06Q 10/1053 340/5.61 |
| 2012/0089470 | A1 * | 4/2012 | Barnes, Jr. | G06Q 10/1053 705/16 |
| 2012/0095844 | A1 * | 4/2012 | Barnes, Jr. | G06Q 10/1053 705/14.69 |
| 2012/0096358 | A1 * | 4/2012 | Barnes, Jr. | G06Q 10/1053 715/728 |
| 2012/0129500 | A1 * | 5/2012 | Rajadurai | H04L 63/0815 455/411 |
| 2012/0204032 | A1 * | 8/2012 | Wilkins | H04L 9/006 713/170 |
| 2012/0284196 | A1 * | 11/2012 | Vilmos | G06Q 20/32 705/71 |
| 2013/0016838 | A1 * | 1/2013 | Hu | H04L 63/065 380/255 |
| 2013/0085875 | A1 * | 4/2013 | Lamba | G06Q 20/027 705/18 |
| 2013/0096966 | A1 * | 4/2013 | Barnes, Jr. | G06Q 10/1053 705/5 |
| 2013/0311299 | A1 * | 11/2013 | Quady | G06Q 30/0269 705/14.66 |
| 2013/0332366 | A1 * | 12/2013 | Kalinichenko | G06Q 20/322 705/64 |
| 2014/0018059 | A1 * | 1/2014 | Noonan | H04W 48/04 455/419 |
| 2014/0229385 | A1 * | 8/2014 | Neafsey | G06Q 20/3674 705/67 |
| 2015/0349896 | A1 * | 12/2015 | Post | H04B 15/005 235/380 |

OTHER PUBLICATIONS

Constantinescu, S., "Motorola MC959B: The first "mobile" device to ship with a software defined radio [Qualcomm Gobi]." http://www.intomobile.com/2010/09/23/motorola-mc959b-the-first-mobile-device-to-ship-with-a-software-defined-radio-qualcomm-gobi/, Sep. 23, 2010, 10 pages.

Gobjuka, H., "4G Wireless Networks: Opportunities and Challenges," Verizon, 6 pages.

(56) References Cited

OTHER PUBLICATIONS

Gupta, P., et al., "The Future of Software Radio: Wireless Network Cloud," IBM Corporation, 2009, 25 pages.
Intel Solutions for the Next Generation Multi-Radio Basestation Brochure, 8 pages.
Introduction to Software Radio Concepts, Chapter 1, 1.1 The Need for Software Radios, Software Radio: A Modern Approach to Radio Engineering, 2002, 9 pages.
Lehr, W., "Software Radio: Implications for Wireless Services, Industry Structure, and Public Policy," Massachusetts Institute of Technology, Mar. 20, 2003, pp. 1 thru 25.
Parkhi, K., et al., "Software Defined Radio in the Mobile Phone," ARCchart Ltd., Nov. 2007, 17 pages.
International Search Report for International Application No. PCT/US2013/34122, Date of Mailing Jun. 13, 2013, including Written Opinion of the International Search Authority (7 pages total).

* cited by examiner

MOBILE DEVICE SOFTWARE RADIO FOR SECURELY PASSING FINANCIAL INFORMATION BETWEEN A CUSTOMER AND A FINANCIAL SERVICES FIRM

FIELD OF THE INVENTION

The invention relates generally to a software radio that can communicate with a financial institution over more than one radio network, and in particular to a mobile device having a software radio for securely passing financial information between a customer and a financial services firm.

BACKGROUND

Software radio is an emerging technology in wireless communication services. Transmitters and receivers that allow electronic communications to be transmitted using the radio frequency (RF) spectrum are moved from hardware to software. A software radio can be a radio that is substantially defined in software and whose physical layer behavior can be significantly altered through changes to its software. A software radio can define in software its modulation, error correction, and encryption processes, can exhibit some control over the RF hardware, and can be reprogrammed.

SUMMARY OF THE INVENTION

The invention, in various embodiments, features a software radio that can communicate with a financial institution over more than one radio network. A customer of the financial institution can use a mobile device having a software radio to securely pass financial information to the institution. The mobile device can encrypt information and pass it to the financial institution, which has a computing system capable of receiving the information, decrypting the information and carrying out a financial transaction based on the information.

Because information related to a transaction is being transmitted over more than one network, a hacker can not tap into or listen to one network and retrieve all of the information needed to perform an identity theft or fraudulent transaction. For example, encryption information can be transmitted on one network, while secure data is transmitted on a separate and independent network.

Traditionally, radios have been implemented entirely in hardware, with new waveforms added by integrating new hardware. Wireless handsets can support wireless standards: GSM, GPRS, EDGE, WCDMA, HSDPA, Long Term Evolution (LTE), 4G, GPS, mobile TV, Wi-Fi, Bluetooth, WiMAX and UWB. A software radio can support multiple waveforms by re-using the same hardware while changing its parameters in software.

A software radio allows multiple radio standards to operate on common radio frequency hardware, ensuring compatibility among legacy, current, and evolving wireless communication technologies. A software radio is capable of changing its operation by dynamically loading a radio configuration over the air. With different configurations, the device can operate using different wireless communication technologies while having a single transceiver.

In one aspect, there is a method including identifying, by a computing device having a software radio, two or more radio networks available for communication with a financial institution. The method includes transmitting, by the computing device, first information related to a financial transaction over the first radio network to the financial institution; tuning, by the computing device, the software radio from the first radio network to a second radio network independent from the first radio network; and transmitting, by the computing device, second information related to the financial transaction over the second radio network to the financial institution. A server of the financial institution receives the first information and the second information to carry out the financial transaction.

In another aspect, there is a computer program product, tangibly embodied in a machine readable storage device of a computing device having a software radio. The computer program product includes instructions being operable to cause a data processing apparatus of the computing device to identify two or more radio networks available for communication with a financial institution, transmit first information related to a financial transaction over a first radio network to the financial institution, tune the software radio from the first radio network to a second radio network independent from the first radio network, and transmit second information related to the financial transaction over the second radio network to the financial institution. A server of the financial institution receives the first information and the second information to carry out the financial transaction.

In yet another aspect, there is a computing system of a financial institution. The computing system includes a key gateway in communication with a computing device over a first radio network, a data gateway in communication with the computing device over a second radio network independent from the first radio network, and a key storage facility in communication with the key gateway and the data gateway. The computing device has a software radio. The key gateway (A) receives an application level encryption key from the computing device, (B) stores the application level encryption key in the key storage facility, and (C) transmits, to the computing device, a key index indicating a location of the application level encryption key on the key storage facility. The data gateway (A) receives (i) data encrypted, by the computing device, using the application level encryption key and (ii) the key index, (B) retrieves the application level encryption key from the key storage facility, and (C) decrypts the data using the application level encryption key. The decrypted data is transmitted to a server of the financial institution to carry out a financial transaction.

In still another aspect, there is a method including receiving, over a first radio network, by a key gateway of a financial institution in communication with a computing device having a software radio, an application level encryption key from the computing device; storing, by the key gateway, the application level encryption key in a key storage facility; transmitting, to the computing device, by the key gateway, a key index indicating a location of the application level encryption key on the key storage facility; and receiving, over a second radio network, by a data gateway in communication with the computing device over a second radio network, (i) data encrypted, by the computing device, using the application level encryption key and (ii) the key index. The first radio network is independent from the second radio network. The method further includes retrieving, by the data gateway, the application level encryption key from the key storage facility; decrypting, by the data gateway, the data using the application level encryption key; and transmitting, to a server of the financial institution, by the data gateway, the decrypted data to carry out a financial transaction.

In other examples, any of the aspects above, or any apparatus, system or device, or method, process or technique, described herein, can include one or more of the following features.

The software radio can be substantially defined in software of a mobile device. In various embodiments, the first information is an application level encryption key. The second information can be (i) data encrypted using an application level encryption key and (ii) a key index indicating a location of the application level encryption key on the server of the financial institution.

In certain embodiments, the method includes receiving, by the computing device, a key index from the server of the financial institution, where the key index indicates a location of an application level encryption key on the server of the financial institution; encrypting, by the computing device, data using the application level encryption key; and transmitting, by the computing device, the second information to the financial institution, wherein the second information includes the data and the key index.

In some embodiments, a first rating for the first radio network and a second rating for the second radio network are determined to identify the first radio network as being independent from the second radio network.

In certain embodiments, a visual indicator is provided to a user of the computing device to indicate that the first radio network is independent from the second radio network, and input from the user is received to initiate transmission of the first information and the second information over the respective networks.

The first radio network being independent from the second radio network means that the networks operate on different frequencies, utilize different transmission protocols, or are operated by different carriers.

The data gateway can include a data decryption module to decrypt the data using the application level encryption key.

Other aspects and advantages of the invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

Figure 1:
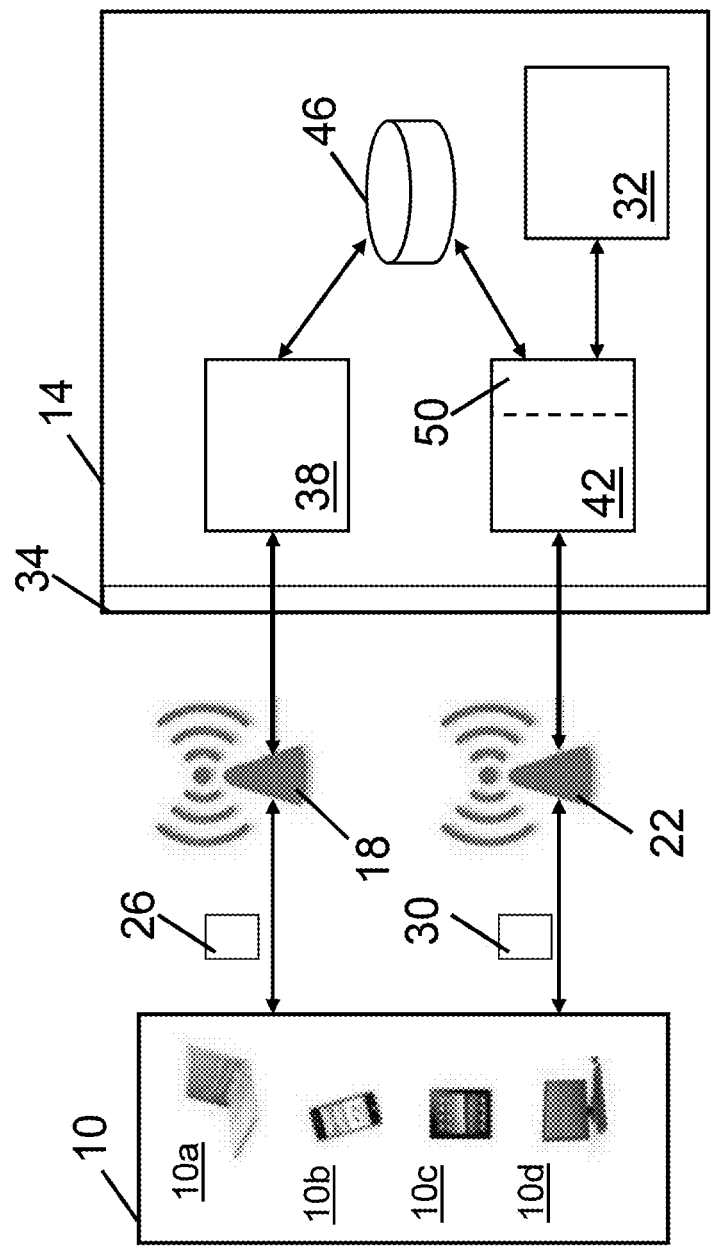
FIG. 1 is a block diagram showing a system securely passing financial information between a customer and a financial services firm.

FIG. 1 shows a system for securely passing financial information between a customer and a financial institution. The customer or user has a computing device 10 having a software radio. The computing device 10 can communicate with a computing system 14 of the financial institution over a plurality of communication channels. As shown in FIG. 1, computing device 10 and computing system 14 communicate via a first radio network 18 and a second radio network 22. The networks can include base stations for wireless communication.

The computing device 10 including the software radio can be, for example, a notebook computer 10a, a handheld mobile device 10b, a tablet 10c, a desktop computer 10d or the like. The software radio can be substantially defined in software of a mobile device. The computing device 10 can identify that two or more radio networks are available for communication with the financial institution. The first and second radio networks are independent from one another, meaning that the networks operate on different frequencies, utilize different transmission protocols, or are operated by different carriers.

The computing device 10 can transmit first information 26 related to a financial transaction over the first radio network 18 to the financial institution. The computing device 10 can tune the software radio from the first radio network 18 to the second radio network 22, and transmit second information 30 related to the financial transaction over the second radio network 22 to the financial institution. The computing system 14, or a server 32 of the computing system 14 of the financial institution, receives the first information 26 and the second information 30 to carry out the financial transaction. The first information 26 can be an application level encryption key. The second information 30 can be (i) data encrypted using the application level encryption key and (ii) a key index indicating a location of the application level encryption key on a server of the financial institution.

The computing system 14 of the financial institution is separated from outside networks via a firewall 34. The computing system 14 includes a key gateway 38, a data gateway 42, and a key storage facility 46. The key gateway 38 is in communication with the computing device 10 over the first radio network 18. The data gateway 42 is in communication with the computing device 10 over the second radio network 22. The key storage facility 46 is in communication with the key gateway 38 and the data gateway 42. In certain embodiments, the data gateway 42 includes a data decryption module 50.

The key gateway 38 receives an application level encryption key from the computing device 10. The application level encryption key is stored in the key storage facility 46, for example, by the key gateway 38. A key index is transmitted to the computing device 10 via the key gateway 38. The key index indicates a location of the application level encryption key on the key storage facility 46. The data gateway 42 receives (i) data encrypted, by the computing device, using the application level encryption key and (ii) the key index. The data gateway 42 retrieves the application level encryption key from the key storage facility 46, and decrypts (e.g., using the data decryption module 50) the data using the application level encryption key. The decrypted data is transmitted to a server 32 of the financial institution to carry out a financial transaction.

Examples of financial transactions include, but are not limited to buying, selling or trading securities with a brokerage service, making payments on a mortgage, transferring money from one financial account to another financial account within the same financial institution or between different financial institutions, making gifts of money of financial instruments for charitable or any other purposes, requesting participation in an initial public offering, requesting financial portfolio rebalancing, and requesting deferred actions such as a change in 401k contribution amounts.

Figure 2:
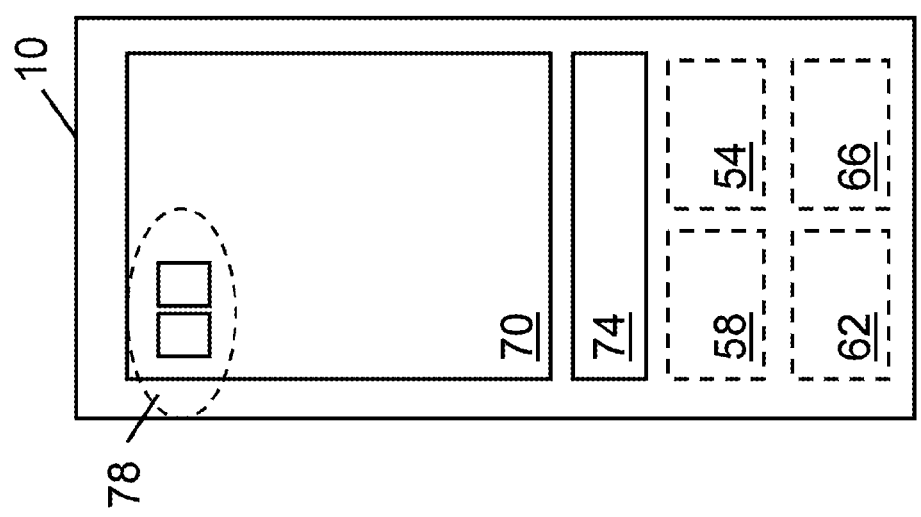
FIG. 2 is a block diagram of an embodiment of a computing device including a software radio.

FIG. 2 shows an example of a mobile computing device 10 including a software radio 54 substantially defined in software of the computing device 10. The computing device 10 includes a transceiver 58, memory 62 and a controller 66. The computing device 10 includes a display 70 and an input device 74.

The controller 66 can run an application to determine to which networks the device can use to transmit data and information. The display 70 can include a visual indicator 78 to indicate to the user that the radio networks are available and are independent.

The controller 66 can include a data encryption module that creates an application level encryption key and encrypts data using the application level encryption key. The controller 66 can transmit, using the software radio 54, via the transceiver 58, the key over the first network to the computing system 14. A network handshake through a standard secure protocol is used to pass the encryption key from the computing device 10 to the financial institution via the first network. Likewise, the controller 66 can receive the key index from the computing system 14 (preferably over the first network) and store the key index in memory 62. The software radio 54 can tune from the first network to the second network. The controller 66 can then retrieve the key index and data from memory 62, and transmit, using the software radio 54, via the transceiver 58, the information over the second network to the computing device 14.

In some embodiments, the controller 66 can rate the networks, so that a first network and second network can be selected. The basis for the rating is any combination of the strength, security, carrier, protocol, physical signal frequency, probability of an attack in the network, and prior history of network reliability. A first rating for the first radio network and a second rating for the second radio network can be used to determine or to identify that the first radio network is independent from the second radio network.

The input device 74 can be a touch screen or a keypad. When networks have been identified as being independent, the user can enter input via the input device 74 to initiate transmission of the first information and the second information over the respective networks.

The above-described systems and methods can be implemented in digital electronic circuitry, in computer hardware, firmware, and/or software. The implementation can be as a computer program product (e.g., a computer program tangibly embodied in an information carrier). The implementation can, for example, be in a machine-readable storage device for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, tablet) with a world wide web browser (e.g., Microsoft® Internet Explorer® available from Microsoft Corporation, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computing system of a financial institution, comprising:
    a key gateway in communication with a user computing device over a first radio network, wherein the user computing device comprises a software radio and a transceiver, and wherein the user computing device communicates with the key gateway over the first radio network via the transceiver using a first waveform based on operation of the software radio with first software radio parameters;
    a data gateway in communication with the user computing device over a second radio network independent from the first radio network, wherein the user computing device communicates with the data gateway over the second radio network via the transceiver using a second waveform based on operation of the software radio with second software radio parameters; and
    a key storage facility in communication with the key gateway and the data gateway;
    wherein the key gateway (A) receives an application level encryption key from the user computing device, wherein the application level encryption key is created by the user computing device, (B) stores the application level encryption key in the key storage facility, and (C) transmits, to the user computing device, a key index indicating a location of the application level encryption key on the key storage facility;
    wherein the user computing device dynamically tunes from the first radio network to the second radio network upon receipt of the key index;
    wherein the data gateway (A) receives over the second radio network (i) data encrypted, by the user computing device, using the application level encryption key and (ii) the key index, (B) retrieves the application level encryption key from the key storage facility, and (C) decrypts the data using the application level encryption key; and
    wherein the decrypted data is transmitted to a server of the financial institution to carry out a financial transaction.

2. The computing system of claim 1 wherein the first radio network and the second radio network differ by at least one of operating frequency, physical layer transmission protocol utilized, or carrier operating the network.

3. The computing system of claim 1 wherein the data gateway includes a data decryption module to decrypt the data using the application level encryption key.

4. A method comprising:
    receiving, over a first radio network, by a key gateway of a financial institution in communication with a user computing device comprising a software radio and a transceiver, an application level encryption key from the user computing device, wherein the application level encryption key is created by the user computing device, and wherein the user computing device communicates with the key gateway over the first radio network via the transceiver using a first waveform based on operation of the software radio with first software radio parameters;
    storing, by the key gateway, the application level encryption key in a key storage facility;
    transmitting, to the user computing device over the first radio network, by the key gateway, a key index indicating a location of the application level encryption key on the key storage facility, wherein the user computing device dynamically tunes from the first radio network to the second radio network upon receipt of the key index;
    receiving, over a second radio network, by a data gateway in communication with the user computing device over the second radio network, (i) data encrypted, by the user computing device, using the application level encryption key and (ii) the key index, wherein the first radio network is independent from the second radio network, and wherein the user computing device communicates with the data gateway over the second radio network via the transceiver using a second waveform based on operation of the software radio with second software radio parameters;

retrieving, by the data gateway, the application level encryption key from the key storage facility;

decrypting, by the data gateway, the data using the application level encryption key; and transmitting, to a server of the financial institution over the second radio network, by the data gateway, the decrypted data to carry out a financial transaction.

5. The method of claim 4 wherein the first radio network and the second radio network differ by at least one of operating frequency, physical layer transmission protocol utilized, or carrier operating the network.

6. The method of claim 4 further comprising decrypting the data using a data decryption module of the data gateway.

7. The computing system of claim 1 wherein communications between the key gateway and the user computing device are unencrypted.

8. The computing system of claim 1 wherein the first radio network is based on one of GSM, GPRS, EDGE, WCDMA, HSDPA, Long Term Evolution, 4G, GPS, mobile TV, Wi-Fi, Bluetooth, WiMAX, and UWB.

9. The computing system of claim 1 wherein the second radio network is based on one of GSM, GPRS, EDGE, WCDMA, HSDPA, Long Term Evolution, 4G, GPS, mobile TV, Wi-Fi, Bluetooth, WiMAX, and UWB.

10. The computing system of claim 1 wherein the first and second networks each further comprise one or more base stations.

11. The computing system of claim 1 further comprising a firewall positioned between:
(i) the key gateway and the first radio network; and
(ii) the data gateway and the second radio network.

12. The computing system of claim 1 wherein the financial transaction includes one or more of buying, selling or trading a security with a brokerage service, making a mortgage payment, transferring money from a first financial account to a second financial account wherein the financial accounts are in the same financial institution or at different financial institutions, making a charitable gift, requesting participation in an initial public offering, requesting rebalancing of a financial portfolio, and requesting a change in a contribution to a 401k plan.

13. The method of claim 4 further comprising communicating unencrypted data between the key gateway and the user computing device.

14. The method of claim 4 further comprising communicating over the first radio network using a transmission protocol based on one of GSM, GPRS, EDGE, WCDMA, HSDPA, Long Term Evolution, 4G, GPS, mobile TV, Wi-Fi, Bluetooth, WiMAX, and UWB.

15. The method of claim 4 further comprising communicating over the second radio network is using a transmission protocol based on one of GSM, GPRS, EDGE, WCDMA, HSDPA, Long Term Evolution, 4G, GPS, mobile TV, Wi-Fi, Bluetooth, WiMAX, and UWB.

16. The method of claim 4 further comprising communicating the first and second networks each further comprise one or more base stations.

17. The method of claim 4 further comprising:
positioning a firewall between the key gateway and the first radio network; and
positioning a firewall between the data gateway and the second radio network.

18. The method of claim 4 wherein the financial transaction includes one or more of buying, selling or trading a security with a brokerage service, making a mortgage payment, transferring money from a first financial account to a second financial account wherein the financial accounts are in the same financial institution or at different financial institutions, making a charitable gift, requesting participation in an initial public offering, requesting rebalancing of a financial portfolio, and requesting a change in a contribution to a 401k plan.

19. The method of claim 1 wherein the first waveform and the second waveform differ by one or more of a frequency or wireless standard utilized.

20. The method of claim 4 wherein the first waveform and the second waveform differ by one or more of a frequency or wireless standard utilized.

* * * * *